April 12, 1938.    C. SEAMAN    2,113,949
APPARATUS AND METHOD FOR MAKING CONCEALED EDGE TRIMMING
Filed April 10, 1936    3 Sheets-Sheet 1
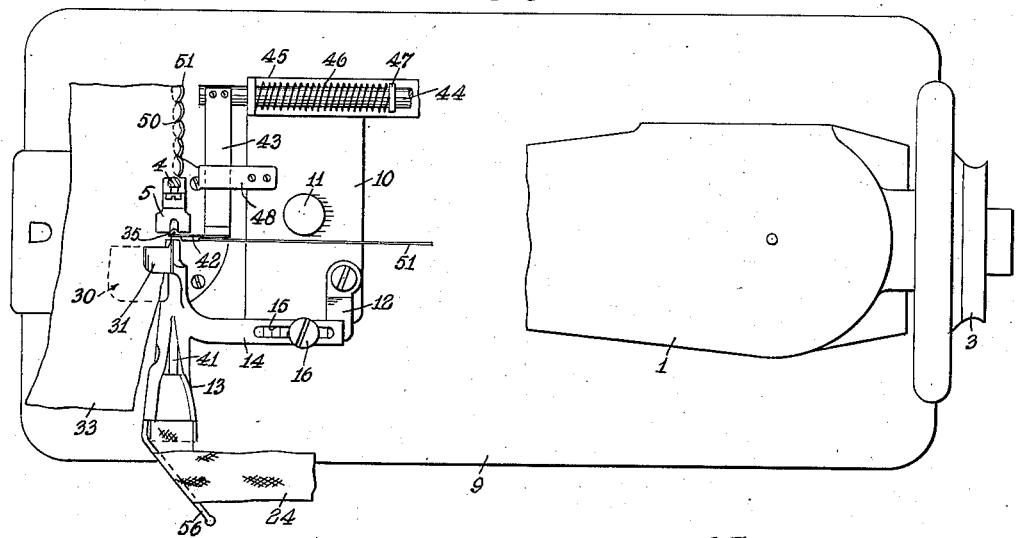
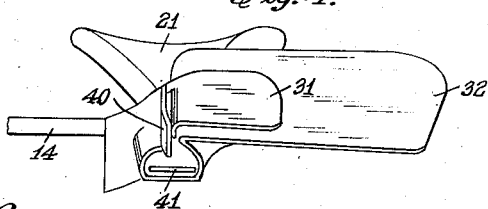
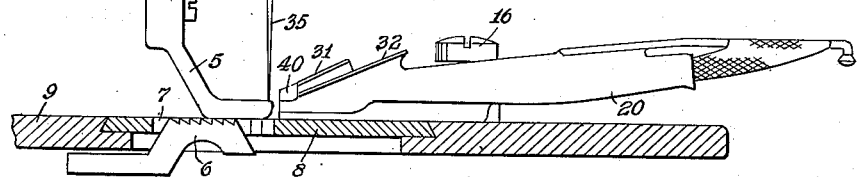
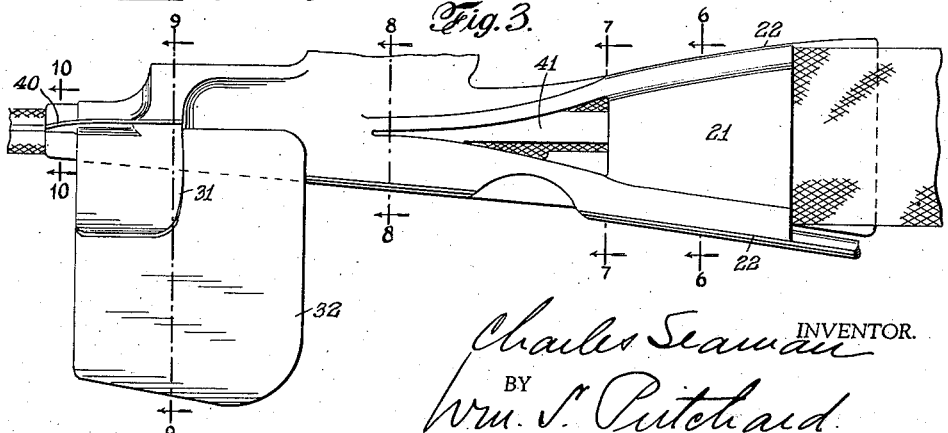

April 12, 1938. C. SEAMAN 2,113,949
APPARATUS AND METHOD FOR MAKING CONCEALED EDGE TRIMMING
Filed April 10, 1936  3 Sheets-Sheet 2
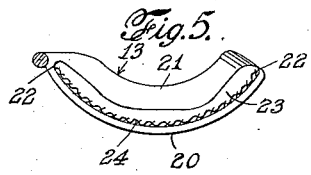
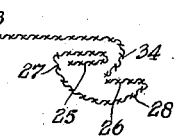
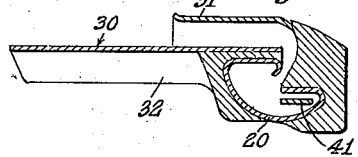
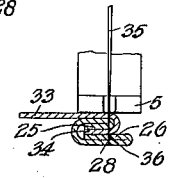
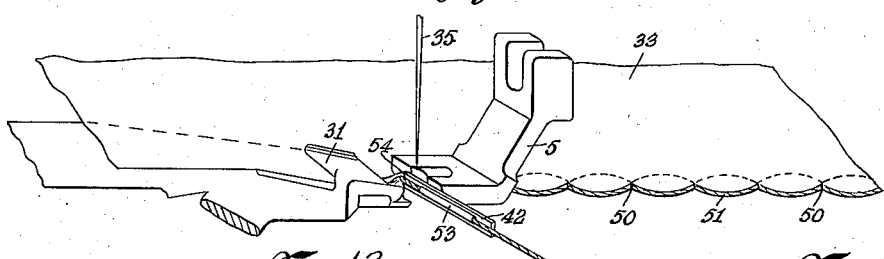
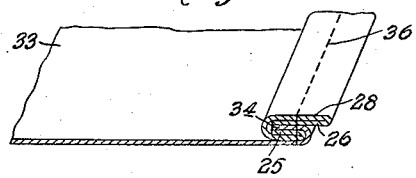
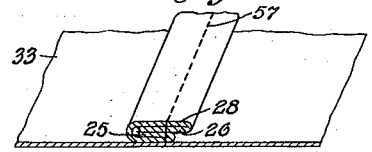
INVENTOR.
Charles Seaman
BY Wm. S. Pritchard ATTORNEY.

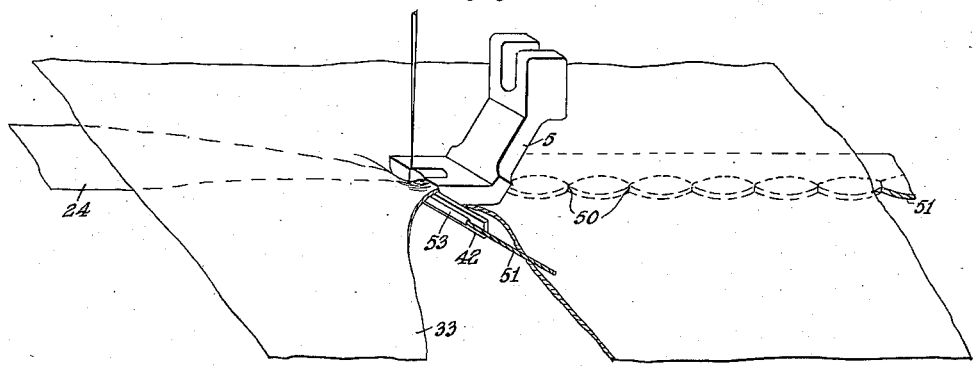
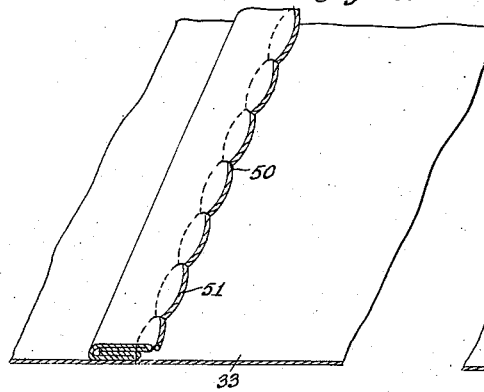
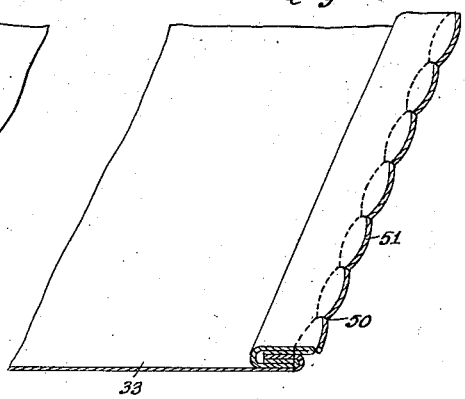
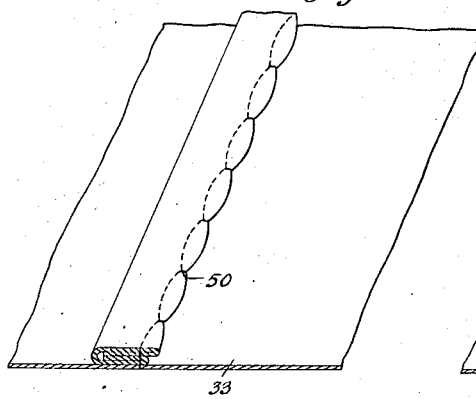
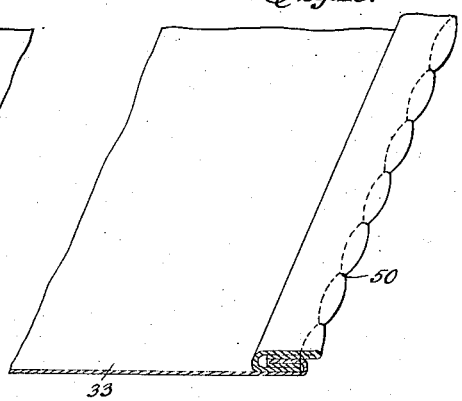

Patented Apr. 12, 1938

2,113,949

UNITED STATES PATENT OFFICE 2,113,949

APPARATUS AND METHOD FOR MAKING CONCEALED EDGE TRIMMING

Charles Seaman, Jamaica Estates, N. Y.

Application April 10, 1936, Serial No. 73,637

24 Claims. (Cl. 112—147)

This invention relates to a method and apparatus for making a concealed edge trimming.

An object of the invention is to provide a method and apparatus for making a trimming having an improved appearance which is attached either at the edge or on the face of a fabric.

Another object is to provide a method and apparatus for making a trimming of the above type with a corded edge.

Another object is to provide a sewing machine or attachment for making and applying the trimming.

Various other objects will be apparent as the nature of the invention is more fully disclosed.

A feature of the invention consists in the provision of means to fold a trimming so as to conceal the raw edges and to attach the same to the fabric by a single row of stitches. When the trimming is attached at the edge of the fabric, this edge is disposed between the folds of the trimming so as to conceal the raw edges, both of the fabric and of the trimming.

Another feature of the invention consists in the provision of means to form a trimming of the above type with a scalloped or purled edge.

Another feature consists in the provision of means for attaching a separate cord at the edges of the trimming to form a corded edge.

Another feature consists in the provision of a folder for prefolding the trimming and feeding the same to the path of the needle in a position to receive the stitches by which it is secured to the fabric.

Other features consist in the details of construction and combinations of parts hereinafter more fully set forth.

Although the novel features which are believed to be characteristic of this invention will be more particularly pointed out in the claims appended hereto, the broader aspects of the invention will be better understood by referring to the following description, taken in connection with the accompanying drawings, in which certain preferred embodiments of the invention have been set forth for purposes of illustration.

In the drawings,

Figure 1 is a top plan view of a portion of a sewing machine head embodying the present invention;

Figure 2 is an end elevation thereof;

Figure 3 is a top plan view of the folder;

Fig. 4 is a perspective view of the folder showing the discharge throat;

Figure 5 is an end elevation of the mouth of the folder;

Figures 6, 7, 8, 9 and 10 are sections taken along the lines 6—6, 7—7, 8—8, 9—9 and 10—10 respectively of Figure 3 showing the shape of the folder at the different sections thereof;

Figures 7a, 8a, 9a and 10a are sectional views of the trimming and fabric as they would appear at the various sections of the folder shown in Figures 7 to 10 respectively;

Figure 11 is a sectional view of the trimming and fabric at the point of stitching;

Figure 12 is a partial perspective view illustrating the manner in which the various parts are fed to the needle for stitching;

Figure 13 is a perspective view of the trimming attached at the edge of a fabric, showing the reverse side of the fabric for clearness;

Figure 14 is a perspective view of the trimming attached to the face of a fabric;

Figure 15 is a partial perspective view similar to Figure 12 but showing the method of feeding the fabric for attaching the trimming to a face thereof;

Figure 16 is a perspective view showing the trimming with a scalloped and corded edge attached to the face of a fabric;

Figure 17 is a perspective view similar to Figure 13, showing the trimming with a scalloped and corded edge attached at the edge of a fabric;

Figure 18 is a perspective view showing the trimming with a scalloped edge attached to the face of a fabric; and Figure 19 is a perspective view similar to Figure 13, showing the trimming with a scalloped edge attached at the edge of a fabric.

In the following description and in the claims, certain specific terms are used for convenience in referring to various details of the invention. These terms, however, are to be given as broad an interpretation as the state of the art will permit.

Referring to the drawings more in detail, the invention is shown as embodied in a sewing machine comprising a head 1 (Figures 1 and 2) carrying a needle bar 2 which is reciprocated by suitable driving means, such as a drive shaft (not shown), driven by a pulley 3 and a presser foot bar 4 carrying the presser foot 5 which is adapted to maintain the material in engagement with feed dogs 6 extending through an aperture 7 in an aperture plate 8 which is attached to the base 9 of the sewing machine head.

It is to be understood that the elements thus far referred to are of standard construction and operate in the usual manner for feeding and stitching the material.

In accordance with the present invention, a base plate 10 is provided which is secured to the base 9 of the machine by suitable means, as by a set screw 11, which extends through the base plate 10 into a tapped hole in said base. The base plate 10 carries a bracket 12 to which a folder 13 is secured by means of an arm 14 having an elongated slot 15 through which a set screw 16 extends into the bracket 12.

The folder 13, as illustrated more in detail in Figures 3 to 10 inclusive, may be made of sheet metal which is bent to form a bottom 20, top 21, and sides 22 (Figure 5) having a concave channel 23 therebetween which is adapted to receive the trimming 24. In successive sections from the mouth to the throat of the folder, illustrated in Figures 6 to 10 respectively, the sides 22 are bent over in an increasing roll so as to fold the trimming about its longitudinal axis into a general U-shape with the edges folded over inwardly to form two plies on each side.

The approximate position of the trimming 24 at the various sections of the folder is illustrated in Figures 5, 6 and 7a to 10a. It will be noted that the trimming 24 is bent into slightly concave form at the mouth of the folder, as illustrated in Figures 5 and 6, and that as it proceeds through the folder the two edges of the trimming are bent over on the inside to form inner plies 25 and 26 and outer plies 27 and 28. As the trimming is discharged from the throat of the folder, the two inner plies 25 and 26 are disposed adjacent each other between the folds formed by the outer plies 27 and 28. For reasons explained hereafter, the exposed edge of the fold formed by plies 26 and 28 extends beyond the exposed edge of the fold formed by plies 25 and 27.

A fabric guide 30 is mounted on the folder near the throat thereof, as indicated in Figures 3 and 9. This fabric guide comprises upper and lower members 31 and 32 respectively which are adapted to guide a fabric 33 and to fold the edge of the fabric downwardly to form a ply 34 between the inner plies 25 and 26 of the trimming. As the fabric and trimming emerge from the throat of the folder, they are in the form illustrated in Figure 10a, with the ply 34 of the fabric 33 folded downwardly against the inner ply 25 of the trimming. As the fabric and trimming together pass under the presser foot, they are folded downwardly, as shown in Figure 11, with the ply 34 of the fabric secured between the adjacent inner plies 25 and 26 of the trimming and with the fabric lying flat over the outer ply 27 of the trimming. In this relative position, the fabric and trimming are passed under the needle 35 in a position to receive a stitch 36 which extends through the face of the fabric 33 and through various plies above mentioned and attaches the trimming to the fabric at the edge thereof and with the various raw edges, both of the trimming and of the fabric, folded in and concealed between the outer plies of the trimming. It is to be understood that the needle 35 is held in the needle bar 2 and cooperates with the various other parts of the sewing machine (not shown) to form the stitch 36 in the usual manner.

A spring finger 40 is carried by the folder 13 adjacent the throat thereof and serves to hold the ply 34 of the fabric 33 and the adjacent plies 25 and 27 of the trimming in their proper position as they are discharged from the throat of the folder. A guide plate 41 is also carried in the folder for properly positioning the trimming therein. It is to be understood that the parts of the folder may be secured in any suitable manner, as by solder, and that the particular shape thereof may be varied so as to effect the desired fold in the material.

It is obvious that, if a wider trimming is used, the edges will be rolled over to form more than two plies, and the invention is accordingly not limited to the use of two plies. It is also obvious that a filler (not shown) may be fed in between the folds of the trimming if a puffed effect is desired.

The mechanism above described provides a concealed edge trimming which is secured at the edge of the fabric and in which the exposed edge of the fold formed by plies 26 and 28 extends beyond the exposed edge of the fold formed by plies 25 and 27, as illustrated in Figure 13. In certain instances, however, a scalloped or purled edge trimming may be desired. This may be readily made in accordance with the present invention by providing a finger 42 (Figures 1 and 12) which extends transversely of the path of feed of the material and is located in advance of the presser foot 5 and in advance of the path of the needle 35. The finger 42 is mounted on an arm 43 which is carried by a rod 44. The rod 44 may be held in a suitable bracket 45 carried by the base plate 10 and may be held normally in a position such that the finger 42 is retracted, by means of a spring 46 seated between the bracket 45 and a collar 47 mounted on the rod 44. A guide 48 may be attached to the base plate 10 to guide the arm 43 for reciprocating movement in a direction transverse to the path of feed of the material. The rod 44 may be actuated by any suitable mechanism which operates in synchronism with the needle 35 for causing the finger 42 to periodically engage the edge of the material adjacent the path of the needle and to press said edge in a transverse direction a sufficient distance past the needle path to cause a stitch 50 to extend entirely over the edge, as shown in Figures 1, 12 and 19. A particular type of control mechanism which may be used for causing this reciprocating movement of the rod 44 is described in detail in my copending application Serial No. 44,498, filed October 11, 1935, for Scalloping device. It is to be understood, however, that the present invention is not limited to the use of this particular mechanism.

It is to be noted that the movement of the finger 42 may be adjusted so as to cause the stitch to extend entirely over the edge or to cause the stitch to be displaced from its normal path by any desired amount. In this way, a scalloping having any desired characteristic may be obtained.

In a further embodiment of the present invention, a cord 51 may be attached to the trimming at the edge thereof (Figures 1, 12 and 17). For this purpose, the finger 42 is provided with a guide 53 which is adapted to guide the cord 51 around the edge 54 of the finger 42. The guide 53 may comprise a cylindrical tube through which the cord 51 feeds and which may be located on the front of the finger 42 so that the cord 51 feeds around the edge of the finger and under the presser foot 5. As the fabric and trimming are fed to the needle, the cord 51 is also fed along the edge of the trimming. The adjustment between the parts is such that the material and cord are shifted laterally by operation of the finger 42 a sufficient amount to cause the stitch 50 to extend over the edge of the trimming and over the cord 51 at each actuation of the finger. The trimming, having a scalloped corded edge formed in the above manner, is illustrated in Figure 17. It is to be understood that the cord 51 and the trimming 24 may be fed in any convenient manner. The cord 51, for example, may be held on a spool (not shown) and fed across the base of the machine, as indicated in Figure 1. The trimming 24 may be held and fed in a similar manner. A guide wire 56 may be attached to the folder 13 to guide the trimming into the mouth of the folder.

In the above-described device, the folder may be adjusted laterally by means of the set screw 16 and may be adjusted so as to properly position the trimming with respect to the fabric. By altering this adjustment or by changing the position of the fabric with respect to the fabric guide 30, the amount of the ply 34 which is folded in between the folds of the trimming may be varied as desired. Obviously, the edge of the fabric may be prefolded to form more than one ply or, in some instances, the fabric may be so fed that the edge is disposed at the top of the trimming instead of being folded between the plies thereof.

It is to be understood that the reverse side of the fabric is shown in Figures 13, 17 and 19 for clearness. This side is at the bottom while the trimming is being attached in the sewing machine and is also the concealed side during use. As viewed from the front or exposed face, the trimming is only visible as a narrow edging which projects slightly beyond the edge of the fabric.

In some instances, it may be desirable to attach the trimming to the face of the fabric instead of to the edge thereof. This may be readily accomplished, as illustrated in Figure 15, by feeding the trimming 24 and the cord 51 to the needle in the manner above mentioned but by allowing the fabric 33 to extend entirely across the top of the folder 13, as indicated in Figure 15, instead of feeding the edge of the fabric into the fabric guide 30. In this way, the trimming may be disposed in any desired location with respect to the edge of the fabric. A trimming applied in this manner is illustrated in Figure 14, which shows the raw edges of the trimming folded in and concealed and the trimming secured to the fabric 33 by means of a single stitch 57.

If it is desired to produce a scalloped or purled edge on this trimming, the fabric 33 is fed over the finger 42 and under the presser foot 5, as shown in Figure 15, so that the finger 42 is adapted to reciprocate under the fabric 33 and to engage the edge of the trimming without interfering with the normal fabric feed. A trimming made in this manner is illustrated in Figure 18, which is similar to that shown in Figure 19, except that the trimming is applied to the face of the fabric instead of to the edge thereof.

A corded edge may also be applied to this type of trimming by using the guide 53 on the finger 42 and feeding the cord 51 therethrough so that the cord is caused to lie along the edge of the trimming and be attached thereto by spaced stitches 50, as indicated in Figure 16. This type of trimming is made similar to that shown in Figure 17, with the exception that the trimming is applied to the face of the fabric instead of at the edge.

In Figures 14, 16 and 18, the exposed or top face of the fabric is shown. This face is at the bottom while the trimming is being attached in the sewing machine but constitutes the front or exposed face during use.

It is to be noted that the above-described attachment can be applied to any standard type of sewing machine to permit the same to be used for making any of the various types of trimming described above.

While certain specific embodiments of the invention have been shown in detail for purposes of illustration, various changes and modifications may be made therein as will be apparent to a person skilled in the art. The scope of the invention is only to be limited in accordance with the following claims when interpreted in view of the prior art.

I claim:

1. In a sewing machine, a reciprocating needle means to feed a fabric past the path of the needle, a folder formed to fold a trimming material about its longitudinal axis into general U-shape with the edges folded inwardly to form at least two plies on each side whereby the raw edges are concealed by the outer plies and with one side extending beyond the other side to form a narrow edging, said folder being positioned to feed the folded trimming under the fabric with the shorter outer ply adjacent the fabric in a path permitting the needle to penetrate the fabric and the outer and inner plies of the trimming for securing the same with a single row of stitches.

2. In a sewing machine, a reciprocating needle, means to feed a fabric past the path of the needle, a folder formed to fold a trimming material about its longitudinal axis into general U-shape with the edges folded inwardlly to form at least two plies on each side whereby the raw edges are concealed by the outer plies and with one side extending beyond the other side to form a narrow edging, said folder also having means to fold the edge of the fabric over the shorter side of the trimming and in between the inner plies thereof and being positioned to feed the folded fabric and trimming to the needle in a path permitting the needle to penetrate the fabric and the inner and outer plies of the trimming for securing the same with a single row of stitches and with the narrow edging visible beyond the edge of the fabric.

3. In a sewing machine, a reciprocating needle, means to feed a fabric past the path of the needle, a folder formed to fold a trimming material about a folder formed to fold a trimming material about its longitudinal axis into general U-shape with the edges folded inwardly to form at least two plies on each side whereby the raw edges are concealed by the outer plies, said folder also having means to fold the edge of the fabric in between the inner plies of the trimming and being positioned to feed the folded fabric and trimming to the needle in a path permitting the needle to penetrate the fabric and the inner and outer plies of the trimming for securing the same with a single row of stitches, and a finger engaging the edge of the trimming adjacent and ahead of the path of the needle, said finger being movable transversely of the path of feed of the trimming to shift the trimming with respect to the path of the needle so as to displace the stitch toward the edge of the trimming whereby said trimming is caused to have a scalloped edge.

4. In a sewing machine, a reciprocating needle, a folder formed to fold a trimming material about its longitudinal axis into general U-shape with the edges folded inwardly to form at least two plies on each side whereby the raw edges are concealed by the outer plies and with one side extending beyond the other side to form a narrow edging and to feed the same to the needle for stitching, means to feed a separate cord along the edge of the folded trimming, and a finger extending transversely of the path of feed of said fabric and engaging said cord, said finger being movable to periodically shift the trimming and cord transversely of the path of feed thereof an amount such that the stitch is caused to extend over the edge of the trimming and over said cord whereby said cord is periodically secured to the trimming and a scalloped corded edge is produced.

5. In a sewing machine, a reciprocating needle, means to feed a fabric past the path of the needle, a folder formed to fold a trimming with its edges folded inwardly to form at least two plies on each side whereby the raw edges are concealed by the outer plies and with one side extending beyond the other side to form a narrow edging, said folder having means to fold the edge of the trimming over the shorter side of the trimming and in between said inner plies thereof, and being positioned to feed the folded fabric and trimming to the needle in a path permitting the needle to penetrate the fabric and the trimming for securing the same with a single row of stitches, means to feed a separate cord along the edge of the trimming, and a finger extending transversely of the line of feed of said fabric and engaging said cord, said finger being movable to periodically shift the trimming and cord transversely of the path of feed thereof an amount such that the stitch is caused to extend over the edge of the trimming and over said cord whereby said cord is periodically secured to the trimming and a scalloped, corded edge is produced.

6. In a sewing machine, a reciprocating needle, means to feed a fabric past the path of the needle, a folder formed to fold a trimming with its edges folded inwardly to form at least two plies on each side whereby the raw edges are concealed by the outer plies and with one side extending beyond the other side to form a narrow edging, said folder having means to fold the edge of the fabric over the shorter side of the trimming and in between said inner plies thereof, and being positioned to feed the folded fabric and trimming to the needle in a path permitting the needle to penetrate the fabric and the trimming for securing the same with a single row of stitches, and a finger engaging the edge of the trimming adjacent and ahead of the path of the needle, said finger being movable transversely of the path of feed of the trimming to shift the trimming with respect to the path of the needle an amount to cause the stitch to extend over the edge of the trimming whereby said trimming is caused to have a scalloped edge, said finger having guide means thereon for guiding a cord along the edge of the trimming in a position to be secured to said trimming by the stitches above mentioned.

7. In a sewing machine, a reciprocating needle, means to feed a fabric past the path of the needle, a folder formed to fold a trimming with its edges folded inwardly to form at least two plies on each side whereby the raw edges are concealed by the outer plies and with one side extending beyond the other side to form a narrow edging, said folder having means to fold the edge of the fabric over the shorter side of the trimming and in between said inner plies thereof, and being positioned to feed the folded fabric and trimming to the needle in a path permitting the needle to penetrate the fabric and the trimming for securing the same with a single row of stitches, a finger engaging the edge of the trimming adjacent and ahead of the path of the needle, said finger being movable transversely of the path of feed of the trimming to shift the trimming with respect to the path of the needle an amount to cause the stitch to extend over the edge of the trimming whereby said trimming is caused to have a scalloped edge, and means associated with said finger to guide a cord around the edge of said finger and along the edge of the trimming in a position to be engaged by the finger for shifting transversely with the edge of the trimming, whereby the cord is secured to the trimming by the stitches above mentioned.

8. An attachment for a sewing machine having a reciprocating needle and means to feed a fabric past the path of the needle, said attachment comprising a folder formed to fold a trimming material about its longitudinal axis into general U-shape with the edges folded inwardly to form at least two plies on each side whereby the raw edges are concealed by the outer plies and with one side extending beyond the other side to form a narrow edging, and means positioning said folder to feed the folded trimming under the fabric with the shorter outer ply adjacent the fabric in a path permitting the needle to penetrate the fabric and the outer and inner plies of the trimming for securing the same with a single row of stitches.

9. An attachment for a sewing machine having a reciprocating needle and means to feed a fabric past the path of the needle, said attachment comprising a folder formed to fold a trimming material about its longitudinal axis into general U-shape with the edges folded inwardly to form at least two plies on each side whereby the raw edges are concealed by the outer plies and with one side extending beyond the other side to form a narrow edging, said folder also having means to fold the edge of the fabric over the shorter side of the trimming and in between the inner plies thereof, and means positioning the folder to feed the folded fabric and trimming to the needle in a path permitting the needle to penetrate the fabric and the inner and outer plies of the trimming for securing the same with a single row of stitches and with the narrow edging visible beyond the edge of the fabric.

10. An attachment for a sewing machine having a reciprocating needle and means to feed a fabric past the path of the needle, said attachment comprising a folder formed to fold a trimming with its edges folded inwardly to form at least two plies on each side whereby the raw edges are concealed by the outer plies and with one side extending beyond the other side to form a narrow edging, said folder having means to fold the edge of the fabric over the shorter side of the trimming and in between said inner plies thereof, and being positioned to feed the folded fabric and trimming to the needle in a path permitting the needle to penetrate the fabric and the trimming for securing the same with a single row of stitches, and a finger engaging the edge of the trimming adjacent and ahead of the path of the needle, said finger being movable transversely of the path of feed of the trimming to shift the trimming with respect to the path of the needle so as to displace the stitch toward the edge of the trimming whereby said trimming is caused to have a scalloped edge.

11. An attachment for a sewing machine having a reciprocating needle and means to feed a fabric past the path of the needle, said attachment comprising a folder formed to fold a trimming with its edges folded inwardly to form at least two plies on each side whereby the raw edges are concealed by the outer plies and with one side extending beyond the other side to form a narrow edging, said folder having means to fold the edge of the fabric over the shorter side of the trimming and in between said inner plies thereof, and being positioned to feed the folded fabric and trimming to the needle in a path permitting the needle to penetrate the fabric and the trimming for securing the same with a single row of stitches, means to feed a separate cord along the edge of the trimming, and a finger extending transversely of the line of feed of said fabric and engaging said cord, said finger being movable to periodically shift the trimming and cord transversely of the path of feed thereof an amount such that the stitch is caused to extend over the edge of the trimming and over said cord whereby said cord is periodically secured to the trimming and a scalloped corded edge is produced.

12. The method of making a concealed edge trimming which comprises folding the trimming material about its longitudinal axis into general U-shape with the edges folded inwardly to form at least two plies on each side and with one side extending beyond the other side to form a narrow edging, and feeding the folded trimming together with a fabric to a needle with the shorter side of the trimming adjacent the fabric in a position to receive a row of stitches extending through the fabric and through the inner and outer plies of the trimming.

13. The method of making a concealed edge trimming which comprises folding the trimming material about its longitudinal axis into general U-shape with the edges folded inwardly to form at least two plies on each side and with one side extending beyond the other side to form a narrow edging, folding the edge of a fabric over the shorter side of the trimming and in between the two inner plies thereof, and feeding the folded fabric and trimming to a needle in a position to receive a stitch extending through the various plies whereby the trimming and fabric are secured by a single row of stitches and the raw edges are concealed within the folds of the trimming and with the narrow edging visible beyond the edge of the fabric.

14. The method of making a concealed edge trimming which comprises folding the trimming material about its longitudinal axis into general U-shape with the edges folded inwardly to form at least two plies on each side, folding the edge of a fabric between the two inner plies of the trimming, feeding the folded fabric and trimming to a needle in a position to receive a stitch extending through the various plies whereby the trimming and fabric are secured by a single row of stitches and the raw edges are concealed within the folds of the trimming, and periodically shifting the edge of the trimming transversely with respect to the needle to cause a stitch to extend over the edge of the trimming so as to produce a scalloped effect.

15. The method of making a concealed edge trimming which comprises folding the trimming material about its longitudinal axis into general U-shape with the edges folded inwardly to form at least two plies on each side, folding the edge of a fabric between the two inner plies of the trimming, feeding the folded fabric and trimming to a needle in a position to receive a stitch extending through the various plies whereby the trimming and fabric are secured by a single row of stitches and the raw edges are concealed within the folds of the trimming, feeding a cord along the edge of the trimming, and periodically shifting the trimming and cord transversely with respect to the needle so as to cause a stitch to extend over the cord and over the edge of the trimming for securing the cord and trimming with a single row of stitches and producing a scalloped corded edge.

16. In a sewing machine, a reciprocating needle, means to feed a fabric past the path of the needle, a folder formed to fold a trimming material about its longitudinal axis into general U-shape with the edges folded inwardly to form at least two plies on each side whereby the raw edges are concealed by the outer plies and having a spring finger confining one side of the trimming to cause the other side to extend therebeyond to form a narrow edging, said folder being positioned to feed the folded trimming under the fabric with the shorter outer ply adjacent the fabric in a path permitting the needle to penetrate the fabric and the outer and inner plies of the trimming for securing the same with a single row of stitches.

17. In a sewing machine, a reciprocating needle, means to feed a fabric past the path of the needle, a folder formed to fold a trimming material about its longitudinal axis into general U-shape with the edges folded inwardly to form at least two plies on each side whereby the raw edges are concealed by the outer plies, said folder also having means to fold the edge of the fabric in between the inner plies of the trimming and having a spring finger confining one side of the trimming and the adjacent edge of the fabric to cause the other side of the trimming to extend therebeyond to form a narrow edging and being positioned to feed the folded fabric and trimming to the needle in a path permitting the needle to penetrate the fabric and the inner and outer plies of the trimming for securing the same with a single row of stitches and with the narrow edging visible beyond the edge of the fabric.

18. An attachment for a sewing machine having a reciprocating needle and means to feed a fabric past the path of the needle, said attachment comprising a folder formed to fold a trimming material about its longitudinal axis into general U-shape with the edges folded inwardly to form at least two plies on each side whereby the raw edges are concealed by the outer plies and having a spring finger confining one side of the trimming to cause the other side to extend therebeyond to form a narrow edging, and means positioning said folder to feed the folded trimming under the fabric with the shorter outer ply adjacent the fabric in a path permitting the needle to penetrate the fabric and the outer and inner plies of the trimming for securing the same with a single row of stitches.

19. An attachment for a sewing machine having a reciprocating needle and means to feed a fabric past the path of the needle, said attachment comprising a folder formed to fold a trimming material about its longitudinal axis into general U-shape with the edges folded inwardly to form at least two plies on each side whereby the raw edges are concealed by the outer plies, said folder also having means to fold the edge of the fabric and having a spring finger confining one side of the trimming adjacent one edge of the fabric causing the other side of the trimming to extend therebeyond to form a narrow edging in between the inner plies of the trimming, and means positioning the folder to feed the folded fabric and trimming to the needle in a path permitting the needle to penetrate the fabric and the inner and outer plies of the trimming for securing the same with a single row of stitches and with the narrow edging visible beyond the edge of the fabric.

20. In a sewing machine, a reciprocating needle, means to feed a fabric past the path of the needle to receive a row of stitches, a folder formed to fold a trimming material about its longitudinal axis into general U-shape with the edges folded inwardly to form at least two plies on each side, said folder being positioned to feed the folded trimming with the fabric, and means periodically shifting the folded trimming transversely across the path of the needle so as to periodically vary the stitch with respect thereto and to produce a scalloped effect.

21. In a sewing machine, a reciprocating needle, means to feed a fabric past the path of the needle to receive a row of stitches, a folder formed to fold a trimming material about its longitudinal axis into general U-shape with the edges folded inwardly to form at least two plies on each side, said folder being positioned to feed the folded trimming with the fabric, and a finger engaging the edge of the folded trimming adjacent and ahead of the path of the needle, said finger being movable transversely of the path of feed of the needle to shift the same laterally with respect to the path of the needle so as to periodically displace the position of the stitch with respect to said trimming and to produce a scalloped effect.

22. In a sewing machine, a reciprocating needle, means to feed a fabric past the path of the needle, means to fold the edge of said fabric over to form two plies, means to feed said folded edge to the path of the needle in a position to secure said plies with a single row of stitches, means to fold a trimming material about its longitudinal axis into general U-shape with the edges folded inwardly to form at least two plies on each side and to feed the folded trimming with the fabric, and means to periodically shift said folded trimming transversely with respect to the path of the needle for varying the position of said stitch with respect thereto so as to produce an irregular effect.

23. An attachment for a sewing machine having a reciprocating needle and means to feed a fabric to the path of said needle for stitching, said attachment comprising a folder formed to fold a trimming material about its longitudinal axis into general U-shape with the edges folded inwardly to form at least two plies on each side, said folder being positioned to feed the folded trimming with the fabric, and a finger engaging the edge of the folded trimming adjacent and ahead of the path of the needle, said finger being movable transversely of the path of feed of the needle to shift the same laterally with respect to the path of the needle so as to periodically displace the position of the stitch with respect to said trimming and to produce a scalloped effect.

24. An attachment for a sewing machine having a reciprocating needle and means to feed a fabric to the path of said needle for stitching, said attachment comprising means to fold the edge of said fabric over to form two plies, means to feed said folded edge to the path of the needle in a position to secure said plies with a single row of stitches, means to fold a trimming material about its longitudinal axis into general U-shape with the edges folded inwardly to form at least two plies on each side and to feed the folded trimming with the fabric, and means to periodically shift said folded trimming transversely with respect to the path of the needle for varying the position of said stitch with respect thereto so as to produce an irregular effect.

CHARLES SEAMAN.